United States Patent Office 3,394,026
Patented July 23, 1968

3,394,026
METHOD OF GLAZING SILICON NITRIDE
SHAPED BODY AND ARTICLE
Norman Lawrence Parr and George Frank Martin, Ridge,
Wareham, Dorset, England, assignors to National Research Development Corporation, London, England, a British corporation
No Drawing. Original application Feb. 18, 1960, Ser. No. 9,416, now Patent No. 3,222,438, dated Dec. 7, 1965. Divided and this application Sept. 3, 1963, Ser. No. 309,914
Claims priority, application Great Britain, Feb. 27, 1959, 6,866/59
6 Claims. (Cl. 117—125)

The present invention relates to heat resisting material capable of withstanding high temperatures and resistant to creep and thermal shock at those temperatures and to a method for producing such material.

This application is a division of our co-pending application Ser. No. 9,416, filed Feb. 18, 1960.

Advances in gas turbine and rocket design are now demanding engineering materials with good mechanical properties at temperatures in excess of 1000° C., a figure which is generally considered to approach the upper limit of high temperature alloy development. Some hope is still entertained that molybdenum or niobium-based alloys can be developed with sufficient self- or surface-induced resistance to high temperature oxidation in order that their good creep properties may be exploited at such temperatures. Considerable effort has also been spent in an endeavour to produce mixtures of ceramics and metals (cermets) in order that the refractoriness of the one, and the ductility of the other, may be combined to produce a ductile material with good creep strength and oxidation resistance at these high temperatures.

So far, however, no published particulars have been given of any material which satisfied all conditions liable to be encountered in service at these temperature levels. Where stability, oxidation resistance and creep strength of the refractory type compounds were found to be adequate, the results were invariably invalidated by lack of resistance to thermal shock. An experimental programme was therefore commenced under Admiralty auspices aimed at finding material which would satisfy all conditions demanded by gas turbine nozzle guide vanes operating at temperatures of the order of 1200° C.

A number of compounds and cermets were prepared, but while some of these had good oxidation resistances at 1200° C., they were invariably brittle at room temperature, and all of them had poor resistance to thermal shock except silicon nitride. It was decided to accept the room temperature brittleness of silicon nitride and to concentrate upon its further study and development. Workers at the British Ceramic Research Association had also found that silicon nitride has good oxidation resistance, and a low coefficient of thermal expansion, with consequent high resistance to thermal shock, and have reported other properties, (see Reports by B. Vassiliou, T. A. Ingles, P. Popper and S. N. Ruddlesden issued by the British Ceramic Research Association).

Preliminary thermal shock tests were conducted by us on silicon nitride by plunging samples repeatedly heated to 1000° C. into cold water. The material stood up to these tests without sign of failure, and this was sufficiently encouraging to warrant further development. An attempt was then made to produce samples of the highest possible density and in the optimum physical condition, and to evaluate their physical and mechanical properties. Subsequently, the crep strength of pure silicon nitride at 1200° C. was found to be inadequate, and effort was then directed towards improving this without sacrificing the other good high temperature properties.

In the course of our researches we have found that an effective heat resisting material unexpectedly resistant to thermal shock at high temperature and having outstanding resistance to creep is silicon nitride containing a dispersion therein of silicon carbide. We have secured excellent properties with a 5%–10% dispersion of very fine silicon carbide in silicon nitride during the reaction-sintering step referred to hereinafter.

The nitriding of silicon is brought about by heating the element in an atmosphere of nitrogen for a period of time, at temperatures above 1200° C. If lump silicon is used, the reaction is confined to the surface, and only a thin layer of nitride is formed. This layer apparently consists of two distinct phases which exhibit free-growing hexagonal forms. These two phases are probably $\alpha$ and $\beta$ hexagonal silicon nitride which have slightly different lattice dimensions. The $\alpha$ phase is believed to be produced by nitriding at temperatures between 1200° and 1400° C., the $\beta$ phase by nitriding at temperatures above 1450° C. A transformation of $\alpha$ to $\beta$ is believed to take place when the former is heated above 1550 C. This transformation does not appear to take place easily in the presence of uncombined silicon at temperatures below 1450° C.

When compacted powder is used, the enormous increase in specific surface enables the nitriding process to be taken to completion in a reasonable time, the weight gain corresponding closely to the formula $Si_3N_4$. The nitriding process appears to be associated with the diffusion of nitrogen into the silicon powder and at temperatures over 1200° C. results in the growth of an interpenetrating matte of $Si_3N_4$ crystals from adjacent silicon particles. This matte fills the pores of the powder compact, thereby imparting mechanical strength, and as it is micro-porous it permits the continuous diffusion of nitrogen to the interior. The rate of the reaction is temperature dependent.

Nitriding is complete in a comparatively short time at 1450° C., whereas many hours are required at lower temperatures. As the highest of these temperatures is above the melting point of silicon (1420° C.) a preliminary reaction-sintering operation at temperatures between 1250 and 1350° C. is necessary so that the collapse of the powder into a molten pool may be avoided. This operation produces a rigid network which retains the uncombined silicon and thus permits a gas-solid-liquid reaction at temperatures above the melting point of silicon, the nitrogen being transported to the central areas through the now intercommunicating silicon nitride matte. The fairly rapid reaction which takes place at 1450° C. results in the conversion of all the remaining silicon to a consolidated form of silicon nitride having a much greater hardness and density than that of the matte produced by solid-state reaction at the lower temperature. The relative hardnesses of the silicon nitride matte, the consolidated silicon nitride, and the uncombined silicon, may be observed by microhardness tests. The nitriding of silicon may be termed a "reaction-sintering process"; prolonged reaction-sintering at temperatures below the melting point of silicon results in the production of a skeleton of consolidated silicon nitride. Various times of reaction-sintering at temperatures below and above the melting point of silicon will result in quite different internal structures in the resulting silicon nitride; a very long reaction-sintering below 1400° C. will produce an extremely dense matte and ultimately a hard skeleton of silicon nitride crystals, whereas a short two-stage reaction-sintering process at 1350° C. and 1450° C. will produce a softer matrix of the silicon nitride matte in which are dispersed islands of hard, consolidated silicon nitride. The density of the fully sintered material will be the same in each case.

The prolonged reaction-sintering times required for the complete nitriding of compacts of silicon powder at temperatures below its melting point are unrealistic for production purposes. We have therefore devised and adopted the following convenient reaction-sintering schedule for subsequent studies of the properties of silican nitride:

Stage I.—Nitriding of the compacted powder is carried out below the melting point of silicon at a temperature of 1250° C. for periods up to 16 hours. This produces an intercommunicating silicon nitride network but the reaction rate gets progressively slower as the silicon nitride matte thickens.

Stage II.—Nitriding is then continued above the melting point of silicon at a temperature of approximately 1450° C. for three or four hours in order to convert all remaining silicon completely to nitride.

The surface of nitrided silicon powder is invariably covered with a white wool-like substance which at high magnifications may be resolved into numerous single-crystal whiskers of silicon nitride. It is pictured that the matte between silicon particles in the body of partially reacted powder is an interpenetrating mass of these single crystals which eventually merge upon prolonged nitriding at temperatures above 1300° C.

When sectioned, silicon nitride has a mottled grey appearance, and if oxygen is present during the nitriding operation another phase, which is possibly white silicon oxynitride, is found to be present. Unreacted silicon may be identified as glittering particles on a fractured surface, or as islands of a bright phase in polished microsections.

The silicon used for our investigation contained about 2% impurity which was mainly iron and oxygen. Analysis of silicon nitride produced by nitriding this grade of silicon powder gave the following figures:

|  | Percent |
|---|---|
| Total silicon | 59.35 |
| Nitrogen | 39.2 |
| Iron | .9 |
| Aluminium | .05 |
| Oxygen | .41 |

We therefore conclude that, apart from a small amount of iron oxide, the silicon nitride was reasonably pure ($Si_3N_4$ theoretically contains 60.24% of silicon and 39.76% of nitrogen).

Commercial nitrogen was used in the first experiments, any oxygen present as impurity being removed by passing the gas over copper gauze heated at 600° C. Moisture was removed by passing the gas through a calcium chloride tower and finally over phosphorus pentoxide. Purer nitrogen was substituted for commercial nitrogen for later experiments, thus enabling the purification train to be simplified, the gas being passed over phosphorus pentoxide only, to remove traces of moisture.

The equipment we used for the production of the silicon nitride consists essentially of a non-porous refractory reaction tube (re-crystallised alumina or mullite), closed at one end, and is located in the centre of a cluster of cruisilite resistance heating elements capable of raising the temperature of the central portion of the reaction tube to 1500° C. A temperature control system is arranged so that a hot zone about 5" long can be maintained to within ±5° C. for long periods. The open end of the reaction tube (which for the work here described was 3" in diameter) was sealed with a water-cooled O ring vacuum endcap provided with ports to accommodate thermo-couple sheaths and gas entry and discharge. A stainless steel heat barrier was provided between the hot zone and the end caps.

Provision was made for the evacuation of the furnace tube prior to the introduction of the nitrogen atmosphere, which was then maintained in the reaction tube at a positive pressure of around 6" Hg. The silicon powder was held either in alumina boats or as powder compresses supported upon grooved alumina or silicon nitride tiles. Heating and cooling cycles were protracted in order to reduce furnace component deterioration to a minimum.

In order for silicon nitride to be useful as an engineering constructional material it must be produced in suitable shapes and in the best possible physical and mechanical condition. Nitriding of loose silicon powder supported in a refractory boat gave it some mechanical strength but the resulting product is very porous and must still be handled with care.

In order to improve its mechanical properties we have found it necessary to compact the powder before nitriding, by means of a suitable pressing operation. There is an optimum degree of powder consolidation beyond which homogeneous reaction-sintering becomes difficult and prolonged, and other production difficulties arise.

The compacting of silicon powder to a suitable shape is most conveniently done by cold-pressing in a suitable die set. Simple cylindrical or rectangular dies give the most easily controllable means of providing even powder packing during the pressing operation. The angular nature of the hard non-ductile fine silicon powder particles explains its resistance to flow under die pressure, which makes the use of deep and intricate die shapes impracticable. Some assistance can be given to flow by mixing into the powder a suitable lubricant before loading the die. This lubrication also gives an additional "green" strength to a cold pressed shape. It is also an advantage to distribute and partially consolidate the powder in an assembled die by light vibration before applying pressure. This expels some of the occluded air and helps to ensure a uniform density before the load is applied. Dies should be designed to allow the ready removal of the "green" pressing which at this stage is extremely delicate and therefore prone to damage by handling. If possible, the "green" pressing should be extruded directly on to its firing tile so that it may be put into the reaction chamber without further handling.

In earlier experiments we used 10% cetyl alcohol in methylated spirits as a binder and lubricant for obtaining "green" shapes, and satisfactory results were produced by using 2–3 ml. of this solution with every 10 gm. of 200-mesh silicon powder. The cetyl alcohol was driven off in the early stages of nitriding, leaving some free carbon in the furnace tube. When it was desired to produce very pure silicon nitride, however, the use of this lubricant was considered undesirable.

Powder pressings made without the aid of a binder are very weak and difficult to handle, but it has been found that moisture can be employed as both binder and lubricant in the production of satisfactory "green" pressings which may be handled from the die to the tile, the moisture then being removed slowly by air or even drying. The optimum quantity of water to be used is a function of the particle size of the silicon powder, but about 3 ml. per 10 gm. of 200-mesh material has been found to give satisfactory results.

Owing to the non-ductile characteristics of silicon powder, we found that the maximum die pressure was limited by the necessity for avoiding the subsequent occurrence of internal cracks in planes of maximum shear stress. Such internal cracking, which inevitably appears at excessive die pressures, persists throughout the entire reaction-sintering process, and is still present in the final product as fissures, the surfaces of which are covered with a white layer. This layer is possibly silicon oxynitride formed by entrapped oxygen escaping along the preferential paths presented by the cracks during the early stages of nitriding. The maximum pressure whcih may be applied at any particular pressing in order to avoid internal fissures must be determined beforehand by examination of the surface and fracture appearance of sacrificial pressings; such internal fissures are readily identified. Care must be taken to avoid local distortion and cracking while the "green" pressing is being removed from the die. Using water as the binder and lubricant it is possible to produce "green" shapes, free from cracks, with loads up to 4 t.s.i. on 200-mesh silicon and up to 2 t.s.i. on 400-mesh silicon in a simple rectangular die. Loads as low as 1 t.s.i. resulted in cracks when silicon powder was pressed in the same die without the addition of an internal lubricant.

We have found is possible to produce "green" powder pressings to any geometrical form finally required provided this is comparatively simple.

Reaction-sintered silicon nitride is difficult to machine; it is sufficiently hard to cause undesirably heavy wear on orthodox machine tools, though it may be machined by diamond-impregnated grinding wheels. A more satisfactory method for producing intricate shapes consists of producing a simple stock silicon powder pressing and then sintering it in nitrogen at a temperature of 1200° C. for an hour or so to produce a loosely sintered product which has a texture somewhat similar to that of soft chalk. The extent of reaction-sintering at this stage is a compromise between that required to give the material sufficient mechanical strength to be gripped in a machine, and too much hardness, which would cause gross wear of machine tools. After this loosely sintered material has been machined to the finished dimensions, it is replaced in the reaction chamber and nitrided in the usual manner. Dimensional changes observed after complete reaction-sintering amount to about 0.01% shrinkage and may therefore be considered insignificant for most practical purposes. By this method it is possible to produce intricate shapes to close tolerances.

The true density of silicon nitride is 3.2, that of the loosely sintered powder 1.5, and that of the cold-pressed sintered material between 2.0 and 2.5. The difference between the theoretical and apparent values arises from the microporosity which remains after the firing operation. Too great a densification of the powder in the cold-pressing stage resists the formation of silicon nitride in the central areas during the standard nitriding process and can be offset only by prolonging unduly the reaction-sintering operation. However, we felt it reasonable to suppose that any increase in density, with corresponding reduction in micro-porosity, would result in an improvement in the mechanical properties of the material. The following attempts were therefore made to see if the average density of 2.2 could be improved upon:

(a) The die pressure was increased up to 16 t.s.i. by employing hydraulic pressure on the outside of a rubber sac containing silicon powder. After a prolonged reaction-sintering operation, silicon nitride having an average density of 2.5 was obtained on small specimens.

(b) An increasing fineness of powder particle size was employed with the standard pressing technique to achieve a better packing coefficient, but without any marked beneficial effect.

(c) Mixed particle sizes were employed in an effort to improve the packing coefficient, but this showed little improvement.

(d) Several mixtures of 200-mesh silicon nitride and silicon powder of the same fineness were cold pressed to 3½ t.s.i. in a standard die set and the "green" pressings nitrided in the usual manner. No increase in density was obtained and subsequent mechanical properties were found to be below those normally expected from straight nitriding of the silicon powder.

(e) Densification of reaction-sintered silicon nitride was attempted by heating the top of a block of the material in an inert atmosphere for 4 hours at about 1700° C. A reduction in cross sectional area took place but as the density of the reduced areas remained unaltered, reduction was assumed to have resulted from partial sublimation.

(f) Attempts were made to hot-press loose silicon nitride powder in a silicon nitride die under a pressure of 1½ t.s.i. for 10 minutes at 1400° C. in an atmosphere of nitrogen. Although some compacting took place the resulting product had little mechanical strength.

(g) Following a suggestion contained in patent specification No. 726,812 for increasing the rate of reaction, 2% calcium fluoride was incorporated in the "green" powder pressing as a possible catalyst to see if this would also improve densification. Its influence on a number of variations of the standard reaction-sintering procedure was studied, but in no case did it influence densification materially, and its presence had an adverse effect on stability and oxidation resistance.

The chemical and physical properties of silicon nitride have been the subject of wide interest for some years, although the structure of its crystal forms has been established only comparatively recently. Little or no information was hitherto available on the mechanical properties of this material.

(a) Chemical and physical properties of silicon nitride

Its dimensional stability and oxidation resistance when subjected to temperatures up to 1400° C. are excellent. When a number of silicon nitride samples were held at 1200° C. for 100 hours, after a small initial gain in weight, which takes place within the first five hours, there is no further change. The inferior oxidation resistance of the partially nitrided sample containing 30% free silicon confirms that the initial gain is probably due to the oxidation of a small amount of unreacted silicon in surface layers to silica. Silicon nitride is not wetted by any of the common metals and therefore it has not yet been found possible to overcome its porosity by infiltration methods. It is not attacked at room temperature by gases containing sulphur or chlorine, and it is resistant to attack by most acids. It is more resistant to hydrofluoric acid than silica but can be decomposed by this acid, or by potassium hydroxide at temperatures around 400° C. It is attacked by sodium chloride and vanadium pentoxide at temperatures of about 1000° C. The apparent density of reaction-sintered powder compacts is around 2.2, which is about two-thirds of the true density of silicon nitride (3.2). The coefficient of linear expansion of silicon nitride is low, and is recorded as $2.5 \times 10^{-6}$ over the range 20° C.–1000° C. Thermal conductivity at an apparent density of 2.2 is given as 0.0037 c.g.s. and electrical resistivity when dry is about $1.4 \times 10^7$ ohm-cm.

(b) Mechanical properties of silicon nitride (i) Young's modulus: An average value for Young's modulus for silicon nitride with a density of 2.2 is 4,000 tons/sq. inch at room temperature and approximately the same value at 1000° C.

(ii) Transverse rupture strength: The transverse rupture strength of reaction-sintered silicon nitride compacts was measued on a three-point loaded beam at room temperature and at 1200° C. on a number of samples with different bulk densities. The results compare favourably with those already published by others.

(iii) Thermal shock resistance: As a result of its low coefficient of expansion, the thermal shock resistance of silicon nitride was expected to be unusually good for a material of the ceramic type. Comparison with other materials was made using the fluidised bed testing technique developed by the National Gas Turbine Establishment. This test, in which special test pieces are submitted to repeated sharp thermal stress gradients, consists of the rapid transference of a wedge-sectioned disc specimen from a hot to a cold fluidised zircon sand bed, and vice versa. By arranging for the cross-section of the taper disc specimen to be comparable with that of the trailing edge of a gas turbine blade, and by adjusting the temperature difference between the hot and cold beds to as much as 1000° C., it is possible to make this test very representative of service conditions in gas turbines presented by sudden "hot starts" or "blow-outs." Results so far obtained indicate that it is possible to subject small taper disc specimens of silicon nitride to as many as 50 cycles of rapid heating and cooling before radial cracks begin to appear at the edges. Present indications are that in terms of thermal shock resistance silicon nitride is one of the best materials of its class, and under some conditions approaches the thermal shock life to be expected from metals.

(iv) Creep strength: The creep strength of silicon nitride was evaluated on a beam specimen which was held at a temperature of 1200° C. and subjected to 4-point loading. Tests were carried out under loads of 1½ t.s.i. for periods up to 400 hours on a beam specimen of average density of 2.1. It was generally considered from these results that the creep resistance of pure silicon nitride at 1200° C. was disappointing, particularly on material of average production density. It was therefore decided to investigate the effect of a fine dispersion of hard stable compounds which could be incorporated during the reaction-sintering process. Compounds employed separately were silica, alumina, molybdenum disilicide, silicon carbide and carbon. The greatest improvement in creep strength was obtained with a 5% addition of silicon carbide. It was subsequently found that the fineness of the dispersion was important, and the best results obtained to date have been with a 5% or 10% addition of silicon carbide powder having a very fine, mixed particle size, the largest particles being no greater than 400 B.S. mesh. Some of the best results obtained indicate that a dispersion of silicon carbide in silicon nitride reduces the primary creep, and gives a low secondary creep rate, so that after 300 hours the total deformation is only one quarter of that of pure silicon nitride of the same density. It is not yet known whether this creep stiffening is attributable to a critical dispersion of silicon carbide throughout the silicon nitride crystals, to a certain degree of solid solution hardening, or to the physical influence of the silicon carbide particles during the nitriding operation. Indications are that the improvemnet in creep strength is associated with the fineness of the particles of the silicon carbide. In an effort therefore to reduce the silicon carbide particle size even further, silicon powder was intimately mixed with colloidal graphite before proceeding with the nitriding operation. Creep tests carried out on silicon nitride formed from silicon powder pressings originally containing 5–10% carbon show that although some improvement has been effected it is still less than that achieved with the addition of fine silicon carbide. As might be expected, density is an important factor in the creep strength of silicon nitride. The creep strength of silicon nitride prepared from hydrostatically pressed powder is about the same as that of material of a lower density, but containing a dispersion of silicon carbide.

The inherent porosity of silicon nitride, with or without silicon carbide additions, could be a serious disadvantage in certain applications. The possibility of developing a glaze which would be closely adherent and which would effectively seal the surface pores was therefore investigated by us. We realised that such a glaze would need a coefficient of thermal expansion similar to that of the parent material, and, if possible, should be self-healing in the event of local rupture. Silica appeared to be the obvious choice, but the formation of a surface glaze merely by dusting the surface of the silicon nitride with fine silica powder and then heating, was found to be unsuccessful. We found, however, that a fine machined surface of silicon nitride tended to become partially self-glazed after prolonged heating at 1200° C. in air when in the presence of alumina. The phase equilibrium diagram for silica and alumina indicates a low melting point eutectic at 5% $Al_2O_3$. The melting point of this eutectic is further lowered in the presence of iron oxide. This was further suggested by the fact that, during attempts at self-glazing, the most promising results were obtained at temperatures above 1500° C. when the operation was carried out on alumina tiles, using silicon nitride containing iron as an impurity. As mentioned above, silicon nitride, as removed from the reaction-sintering furnace, is invariably covered with a fine white dust or wool. It is essential to remove this fine dust by brushing, and if possible by burnishing, before a strongly adherent and even glaze can be applied. The surface-glazing operation is therefore best carried out by meticulously cleaning the surface of the parent material before applying a thin coating of a mixture of 5% fine alumina, 93% silica powder and 2% ferric oxide, bound together with cetyl alcohol. The temperature of the article to be glazed should then be slowly raised to 1300–1500° C. in an atmosphere of oxygen for a period of 3–4 hours and the allowed to fall slowly to ambient. A cross-section of the surface of silicon nitride glazed in this manner shows intimate attachment of the eutectic to the surface and its partial penetration into subsurface cavities. When oxynitride is formed as a result of the presence of oxygen as an impurity, it is identifiable under the microscope as a soft white compound. The presence, after nitriding of this oxynitride on the surface of internal cracks which have been previously formed during the pressing operation, is thought to have been due to oxidation having taken place during nitriding as a result of entrapped oxygen escaping along preferential paths offered by the pressing cracks. It has been observed that when once lined with oxynitride, these cracks do not heal themselves during the nitriding process, nor is their presence on the surface maked by the glazing operation.

The properties and characteristics of silicon nitride made in accordance with our invention were such as to warrant full-scale tests for special uses; these included use in experimental gas turbine units, in combustion chamber tests, and trials in a rocket efflux, as described below.

(a) Use as stator blade material

The initial use envisaged for silicon nitride was as a stator blade for water-cooled high-temperature gas turbines. Experimental nozzle guide vanes were prepared and incorporated in a turbo-blower unit. The maximum operating temperature of this turbine, which employe diesel fuel, was 750° C. although this temperature is much below that envisaged for silicon nitride, the equipment presented a useful opportunity to develop a technique for applying such a material to an engineering design. It was necessary to allow adequate clearance during cold assembly owing to the difference between the coefficient of thermal expansion of silicon nitride stator blades and that of the heat-resistance steel housing in which they were located. The nozzle guide vanes prepared for these trials were provided with lugs which fitted easily into slots out in the shroud rings. Tolerances were arranged so that when the blades were under pressure they were in the precise position demanded by the stator assembly. After 200 hours of intermittent service the nozzle vane ring was removed and the condition of the silicon nitride blades examined. These were found to be in perfect order, and covered with a light layer of combustion debris. Comparative gas bending trials on wafer specimens were carried out in a special combustion chamber operating at temperatures of about 1200° C. for periods of up to 200 hours. The sections of these wafers were such that a certain amount of bending due to creep took place, but there was no sign whatsoever of surface deterioration which might have been expected to result from reaction with fuel oil deposits or erosion by high velocity gas. In none of these trials was there evidence of cracking due to thermal shock. There is no reason to suspect that silicon nitride as a material for gas turbine components will not give entirely satisfactory service provided that adequate provision is made to guard against its room-temperature brittleness during assembly. Design should not follow the conventional practice for metals and alloys, but should take into account the low coefficient of thermal expansion of this new engineering material. In particular, local stress concentrations which could arise from abrupt changes in section or from local pressure exerted as a result of the securing arrangements, should be avoided.

(b) Use as an electrical insulator

Owing to its good thermal shock resistance and high electrical resistivity, silicon nitride has a distinct use for electrical insulators which are expected to resist sudden violent changes in temperature such as are encountered on rocket-launching platforms.

(c) Use as refractory supports in industrial processes

In modern technology much use is made of crucibles, thermocouple sheaths, platforms and supports for advanced heat treatment, and containers for special purification and diffusion processes such as are employed in the semi-conductor field. Silicon nitride is an ideal material for such equipment due to its exceptional thermal shock resistance and complete inertness to molten metals.

(d) Other possible applications

Apart from its obvious use as an engineering material, silicon nitride has applications as a dielectric material. Its thermal shock resistance, and its capacity to act as a carrier for other elements and compounds, suggests that it may also be of use as a medium for holding neutron-absorbing elements in nuclear reactor control rods. A dispersion of 2% boron nitride in silicon nitride has been produced for this purpose. Silicon nitride may also be used as a supporting vehicle for high temperature catalysts.

We claim
1. A method of glazing a shaped body of self-bonded silicon nitride which comprises applying a glaze coating consisting essentially of a mixture of 5% by weight fine alumina, 93% by weight silica powder and 2% by weight ferric oxide suspended in cetyl alcohol as a thin coating to the cleaned surface of said shaped body of silicon nitride, heating the body to raise the temperature thereof to from 1300° C. to 1500° C. in an oxygen atmosphere and then allowing the body to cool.

2. A process according to claim 1 wherein said body is heated at a temperature of 1300° C. to 1500° C. for from 3 to 4 hours.

3. A method of glazing a shaped body of self-bonded silicon nitride having a dispersion therein of fine silicon carbide constituting from 5% to 10% by weight of the whole, which comprises applying a glaze coating consisting essentially of a mixture of 5% by weight fine alumina, 93% by weight silica powder and 2% by weight ferric oxide suspended in cetyl alcohol as a thin coating to the cleaned surface of said shaped body of silicon nitride, heating the body to raise the temperature thereof to from 1300° C. to 1500° C. in an oxygen atmosphere and then allowing the body to cool.

4. A process according to claim 3 wherein said body is heated at a temperature of 1300° C. to 1500° C. for from 3 to 4 hours.

5. A shaped body of self-bonded silicon nitride having a glaze coating produced in accordance with the method of claim 1.

6. A shaped body consisting of self-bonded silicon nitride with a dispersion therein of fine silicon carbide constituting 5% to 10% by weight of the whole having a glaze coating produced in accordance with the method of claim 3.

References Cited

UNITED STATES PATENTS 2,934,667   4/1960   Pincus _____ 117—125 X

OTHER REFERENCES

Sortwell, H. H.: High Fire Porcelain Glazes, Bulletin No. 196, Bureau of Standards Technological Papers—Washington, Government Printing Office, 1921 (pages numbered 3–6, 7–13.

ALFRED L. LEAVITT, *Primary Examiner.*

H. COHEN, *Assistant Examiner.*